Sept. 27, 1932.　　　C. F. A. EDDY　　　1,879,139
SIGNAL SYSTEM
Filed May 29, 1930　　　4 Sheets-Sheet 1
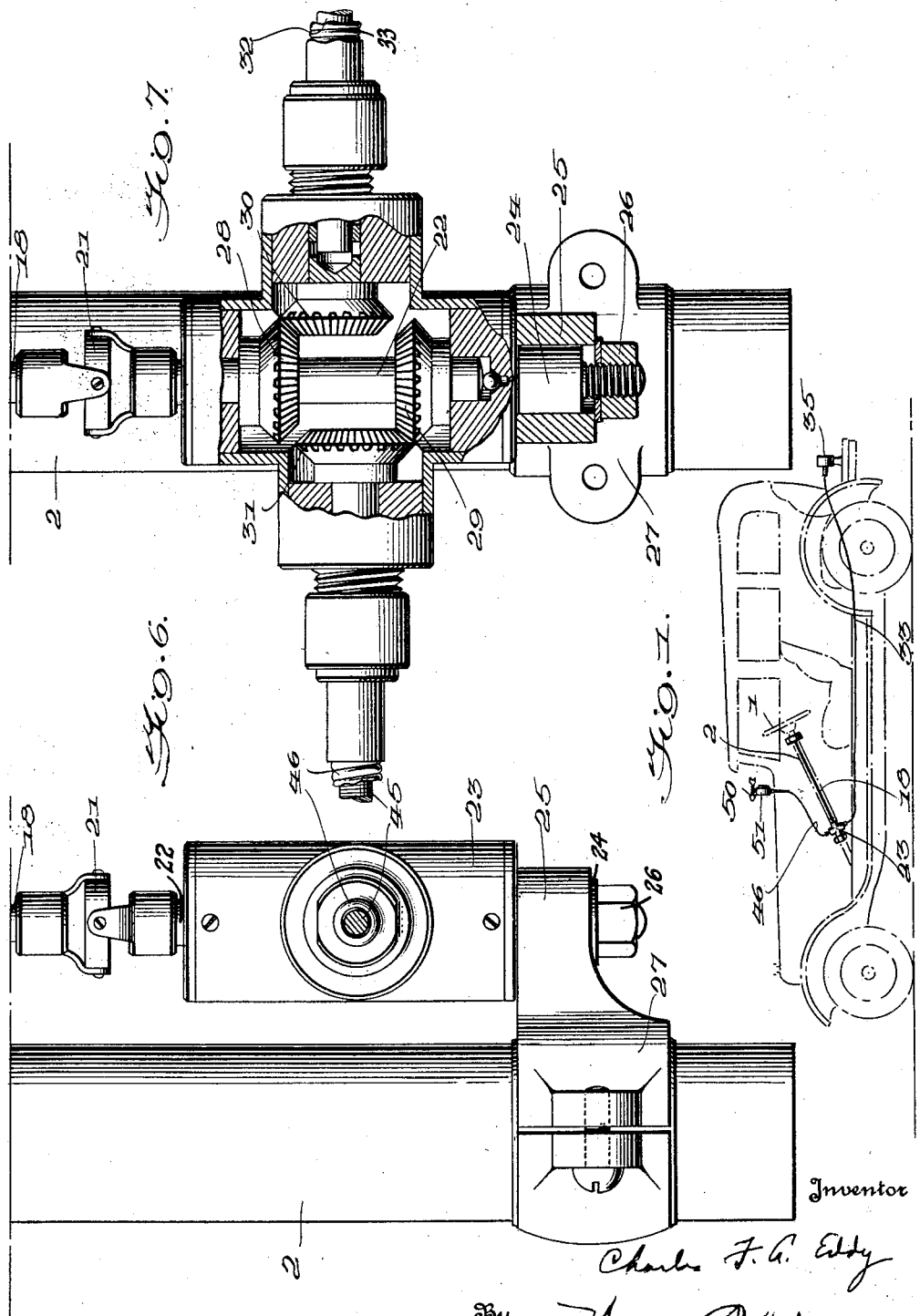
Inventor
Charles F. A. Eddy
By Vernon E. Hodges
his Attorney

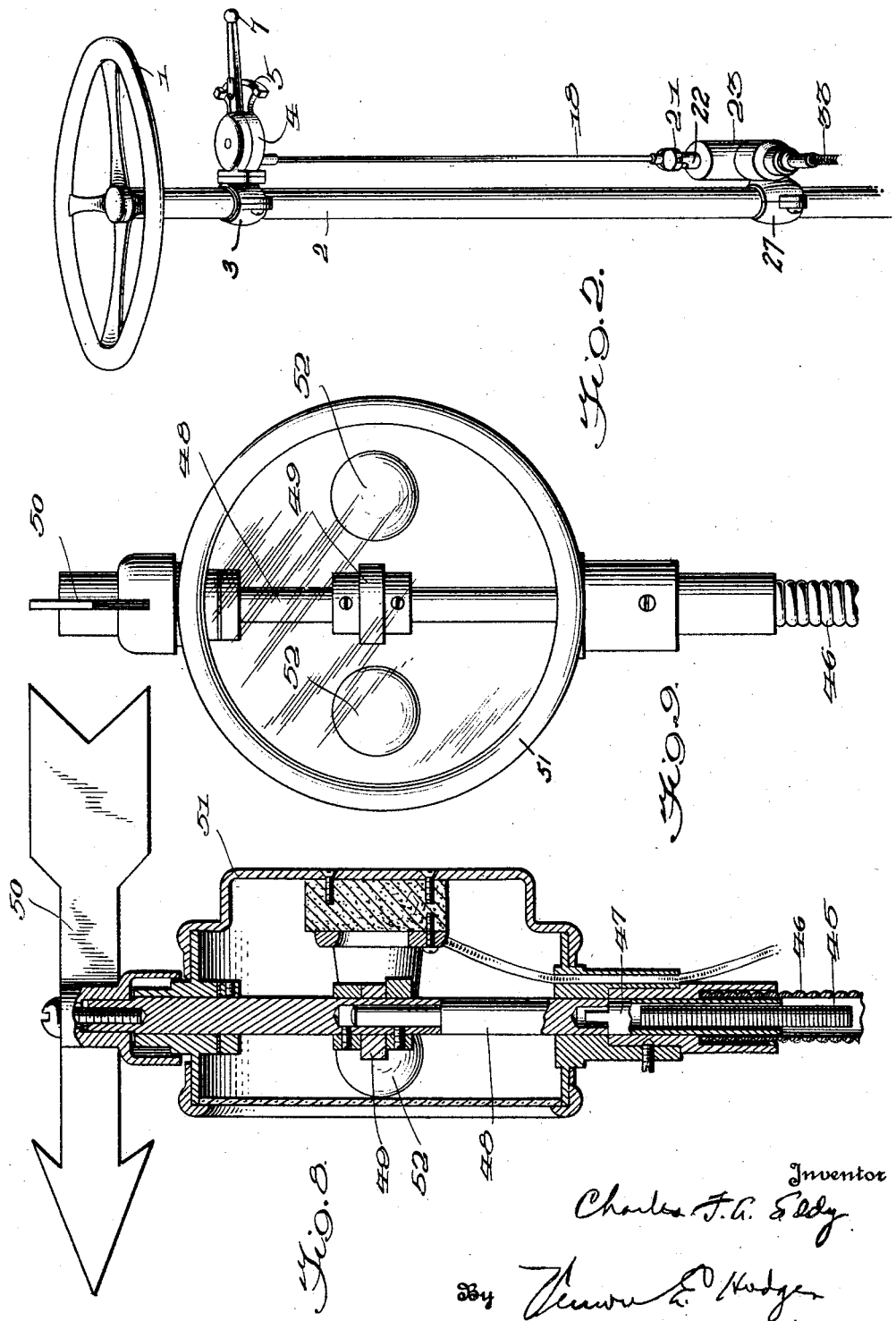

Sept. 27, 1932. C. F. A. EDDY 1,879,139
SIGNAL SYSTEM
Filed May 29, 1930 4 Sheets-Sheet 3
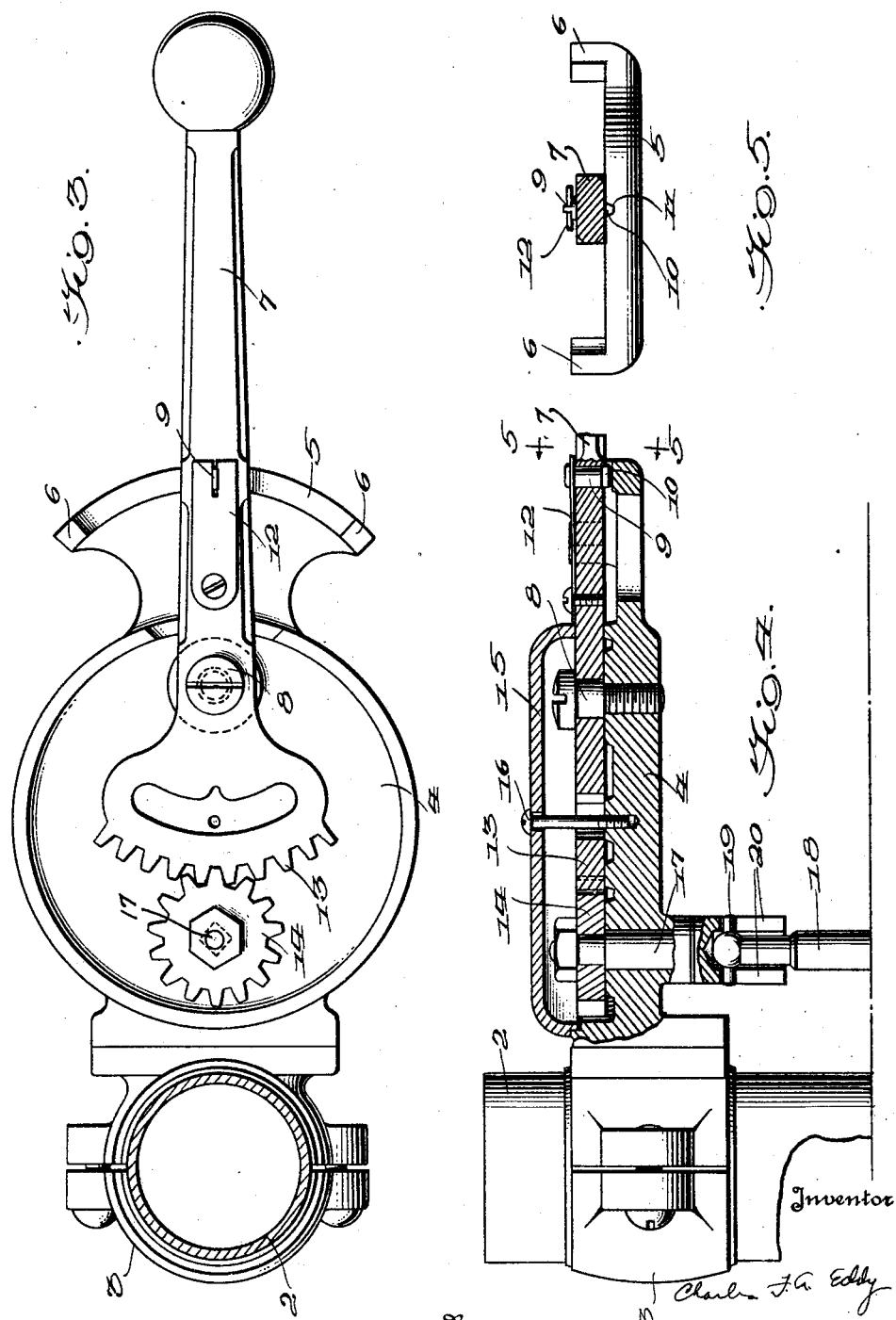

Sept. 27, 1932.  C. F. A. EDDY  1,879,139
SIGNAL SYSTEM
Filed May 29, 1930   4 Sheets-Sheet 4
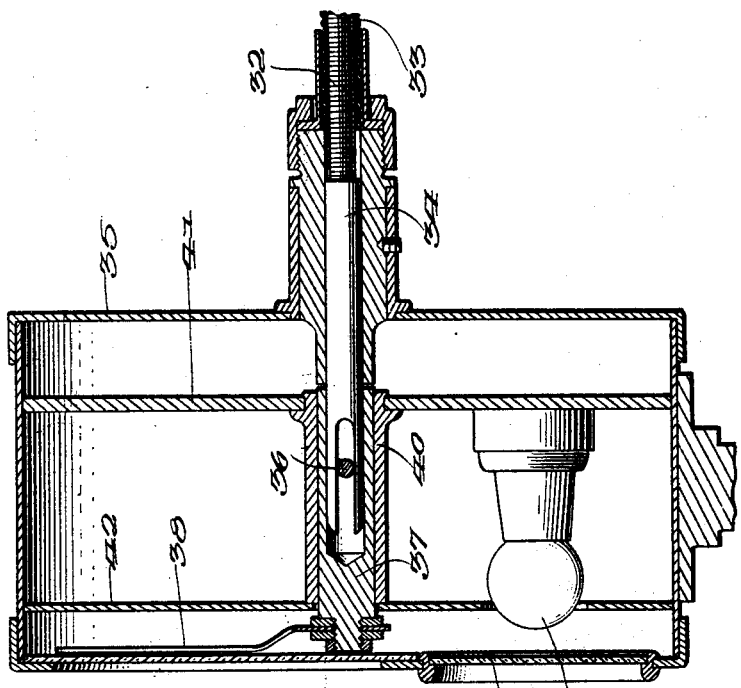
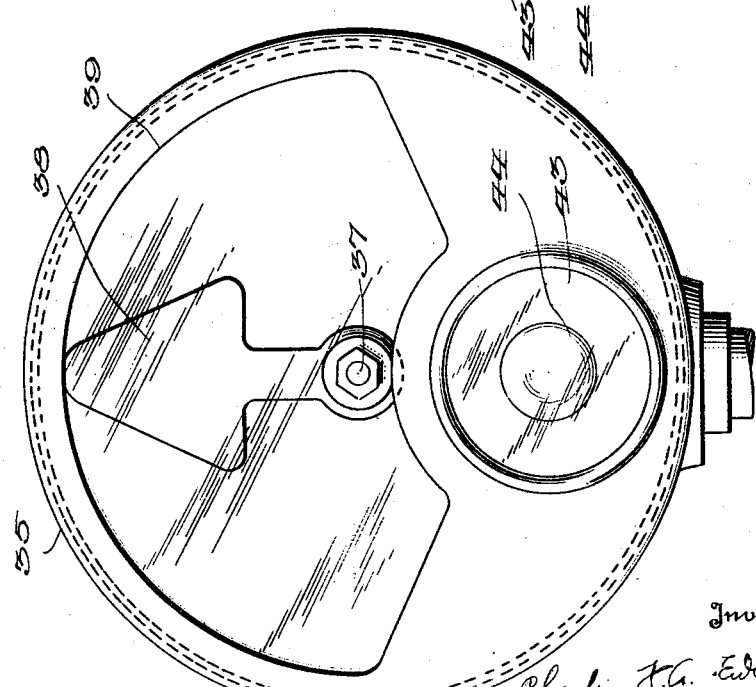

Patented Sept. 27, 1932

1,879,139

UNITED STATES PATENT OFFICE

CHARLES F. A. EDDY, OF NEW LONDON, CONNECTICUT

SIGNAL SYSTEM

Application filed May 29, 1930. Serial No. 456,980.

This invention relates to an improvement in signal systems, and is intended primarily to be applied to automobiles or other vehicles where it is desired to signal either or both front and rear, the direction in which the driver or operator of the vehicle intends to turn and when a turn is to be made.

Heretofore, signals have been mounted at the front and rear of automobiles but they have ordinarily been electrically actuated, which results sometimes in imperfect control and uncertain actuation thereof, with the result that they have not been altogether satisfactory.

It is the object of this invention to avoid the use of an electrically controlled signal and to employ a positive and thoroughly practical method of actuating the signal with an easily applied positive and direct drive from the hand of the operator to the front and rear signals at the same time, causing the indicating means to designate the direction to be indicated and in which the vehicle is to be turned and with a feeling of certainty on the part of the operator that when the control lever is moved, the signals are also moved to the desired extent.

The invention may be easily, quickly and cheaply attached to an automobile or truck and serves as an effective means for actuating the signals.

In the accompanying drawings:

Fig. 1 is a diagrammatic view showing the application of the invention to an automobile;

Fig. 2 is a perspective view of a portion of a steering column with the invention applied thereto;

Fig. 3 is a top plan view of the control lever with the cover removed;

Fig. 4 is a transverse sectional view therethrough;

Fig. 5 is a detail sectional view on the line 5—5 of Fig. 4;

Fig. 6 is a side elevation of the gear casing attached to the steering column;

Fig. 7 is a sectional view therethrough;

Fig. 8 is a sectional view through the front signal indicator;

Fig. 9 is a face view thereof;

Fig. 10 is a face view of the rear signal indicator; and

Fig. 11 is a sectional view therethrough.

The invention is directed primarily to the provision of signals at the front and back of an automobile to indicate the direction that the driver intends to turn, and provision is made for the actuation of such signals manually, as distinguished from electrically, by the operator from a convenient position associated with the steering wheel, preferably.

In Figs. 1 and 2, the steering wheel of the auotmobile or the like is designated generally by the numeral 1, while the steering column is shown at 2. A clamp 3 is secured around the steering column 2, while a casing 4 extends outwardly from and is secured to the clamp, terminating at its outer end in a quadrant 5 having upwardly extending stop arms 6 at the opposite ends thereof, as shown in Figs. 3 and 5. Disposed between the arms 6 is a hand lever 7 pivoted on the set screw 8 and extending outwardly from the casing 4 over the quadrant to within convenient reach of the operator. The lever 7 may be held in a central position by means of a pin 9 having a wedge-shaped lower end 10 in position to enter a notch 11 in the upper surface of the quadrant 5. The pin 9 is normally pressed downward by means of a spring 12.

The lever 7 has a gear sector 13 formed at the inner end thereof in position to mesh with a pinion 14, both of which are housed within the casing 4, which is provided with a cover 15 to inclose the parts, the cover being held in place by a screw 16 permitting its removal.

The pinion 14 is attached to the upper end of a stub shaft 17, the lower end of which receives the upper end of a connecting rod 18, being connected therewith by means of a pin 19, the ends of which project laterally on the upper end of the connecting rod and are received in slots 20 formed in the sides of a flared portion of the stub shaft 17. This forms a pin and slot connection between the stub shaft 17 and the connecting rod 18 for positively rotating the connecting rod from the stub shaft.

As shown in Figs. 2, 6 and 7, the connecting rod 18 is provided with a universal joint 21 in its lower end, the lower end of which universal joint is connected with a stub shaft 22 journaled within a transmission case 23, the lower end of which transmission case is reduced as at 24 and received within a socket 25, where it is adjustably held by means of a nut 26 so as to permit of being oscillated at various angles and to be locked in such different positions.

The socket 25 is fixed to the bracket or clamp 27 by which it is adjustably attached to the steering column 2.

Fixed on the shaft 22 are beveled pinions 28 and 29 arranged in opposed relation, while beveled pinions 30 and 31 respectively mesh with the pinions 28 and 29 on opposite sides of the axis of shaft 22, so that the pinions 30 and 31 will simultaneously be driven and rotate in opposite directions.

Attached to the pinion 30 is a flexible shaft 32 extending through a flexible casing 33, as shown in Figs. 2, 10 and 11, the inner end of the flexible shaft having a forked tip 34 fixed thereto and journaled within the casing 35 of the rear signal or direction indicator. The forked tip 34 receives a pin 36 carried by a stub shaft 37, which stub shaft 37 has a pointer 38 attached to the outer end thereof in position to be moved from side to side within the window 39 formed in the casing 35 of the rear signal. The stub shaft 37 is journaled in a bearing 40 carried by a plate 41 within the casing 35. A second plate 42 is also arranged within the casing immediately behind the indicator 38 and may be suitably colored as found desirable. The casing 35 may also be provided with the usual colored bull's eye 43 and illuminating means 44, which may serve to illuminate not only the bull's eye 43 but also the indicating arm 38, or separate illumination for the latter may be provided.

Referring to Fig. 7, the pinion 31 is attached to a flexible shaft 45 extending through a flexible casing 46, as also shown in Figs. 8 and 9. The flexible shaft 45 has a tip 47 fixed thereto, connecting it with a section or spindle 48, the parts of which spindle are adjustably secured together as at 49 so as to permit of relative adjustment, and the upper section of the spindle carries an indicating arm, such as an arrow 50. The sectional spindle 48 is journaled in the casing 51 designed to be mounted on the front portion of an automobile, as shown in Fig. 1, and to act as a front indicator.

The casing may be open at the front or at the top or both, and illuminating means such as the lights 52 provided to illuminate the casing and the arrow, as may be found desirable.

In the operation of the device, the lever 7 is attached to the steering column 2 and extends to within convenient reach of the steering wheel 1, so that the operator may manipulate the lever 7 without removing his hand from the steering wheel. The lever 7 will normally be disposed in the position shown in Figs. 3 and 5, with the spring-pressed pin 9 in its lower position having its tip 10 received in the notch 11 in the quadrant 5, normally tending to hold the lever in the central position.

A movement of the lever 7 in either direction causes a withdrawal of the pin 9 and through the sector 13 and pinion 14, a rotation of the connecting rod 18, which turns the bevel pinions 28 and 29 and the pinions 30 and 31, meshing therewith, which in turn serve to rotate the flexible shafts 32 and 45, the former extending to the rear signal and swinging the indicating arm 38, while the latter extends to the front signal and rotates the indicating arm or arrow 50, moving these indicators to corresponding positions to indicate the intention on the part of the operator to turn the vehicle to the right or to the left.

This causes a visual indication of the direction in which the operator is to turn the vehicle and, being manually operated, it is positive in its action. The actuation of the control lever causes a positive movement of the signal indicators.

The hand control and gearing transmission are so constructed as to be attached at any desired point on the steering column and distance from each other, allowing the gearing transmission to be placed below the floorboards of the automobile if desired, all by the use of a flexible shaft in lieu of the connecting rod, and in fact the transmission may be located at any desired point on the automobile.

The transmission gearing is also constructed so as to give each outgoing flexible shaft an action independent of the other, thereby giving the proper direction of rotation and causing the front and rear signals to point in the same direction.

I claim:

1. In a signal system, the combination with a steering column for an automobile, of movable signal indicators adapted to be mounted at the front and rear of said automobile, operating shafts connected with said indicators, a main drive-shaft, gearing connecting the main drive-shaft with the operating shafts, a transmission housing enclosing said gearing and adjacent ends of said shafts, a lever for actuating the main drive-shaft, gearing operatively connecting said lever with the main drive-shaft, a housing enclosing said last-mentioned gearing, and clamps for securing the transmission housing and the second-mentioned housing to the steering column.

2. In a signal system, a signal indicator comprising a casing, one or more transverse partitions disposed therein, a bushing fixed in said partition, a shaft operatively mounted in said bushing, an indicatng element carried by said shaft, an operating shaft, and a flexible connection between said operating shaft and the first-mentioned shaft.

3. In a signal system, the combination with a steering column of an automobile, of movable signal indicators, operating shafts connected with said indicators, a main drive shaft, gearing connecting the main drive shaft with the operating shafts, a lever for actuating the main drive shaft, gearing operatively connecting said lever with the main drive shaft, a housing enclosing said last-mentioned gearing, and a clamp for securing said housing to the steering column.

4. In a signal system, the combination with a supporting housing constructed and arranged to be secured to the side of a steering column, of means for actuating a signal indicator including a drive-shaft journaled in the housing, a drive pinion fixed on the drive-shaft, a control lever pivoted to the housing in position to extend laterally from the steering column, a sector carried by the lever and meshing with the pinion, and a quadrant carried by the outer side of the housing and cooperating with the lever.

In testimony whereof I affix my signature.

CHARLES F. A. EDDY.